(12) United States Patent
Schmidt et al.

(10) Patent No.: US 9,027,902 B2
(45) Date of Patent: May 12, 2015

(54) TRANSPORT SECURING DEVICE OF AN AIRCRAFT GAS TURBINE

(71) Applicant: Rolls-Royce Deutschland Ltd & Co KG, Blankenfelde-Mahlow (DE)

(72) Inventors: Marcel Schmidt, Berlin (DE); Alexander Krentz, Dahlewitz (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 30 days.

(21) Appl. No.: 13/936,804

(22) Filed: Jul. 8, 2013

(65) Prior Publication Data

US 2014/0021325 A1    Jan. 23, 2014

(30) Foreign Application Priority Data

Jul. 17, 2012    (DE) .......................... 10 2012 014 108

(51) Int. Cl.
*F16M 13/00*    (2006.01)
*F01D 25/28*    (2006.01)
*F02C 7/20*    (2006.01)

(52) U.S. Cl.
CPC ............... *F01D 25/285* (2013.01); *F02C 7/20* (2013.01)

(58) Field of Classification Search
USPC ......... 248/671, 672, 674, 676, 678, 680, 606; 310/51
See application file for complete search history.

(56) References Cited

U.S. PATENT DOCUMENTS

| 2,661,172 | A | * | 12/1953 | Needham ...................... 248/671 |
| 2,810,536 | A | * | 10/1957 | Cunningham ................ 248/671 |
| 2,957,665 | A | * | 10/1960 | Feiertag et al. ............... 248/606 |
| 5,383,652 | A | | 1/1995 | Van Den Berg |
| 5,452,575 | A | | 9/1995 | Freid |
| 5,746,391 | A | | 5/1998 | Rodgers et al. |
| 5,810,322 | A | * | 9/1998 | Zhao et al. ..................... 248/675 |
| 6,170,141 | B1 | | 1/2001 | Rossway et al. |
| 2011/0139925 | A1 | | 6/2011 | Lisiewicz et al. |

FOREIGN PATENT DOCUMENTS

| DE | 4302206 | 7/1993 |
| DE | 19508510 | 9/1996 |
| DE | 102009054568 | 6/2011 |
| EP | 1265022 | 12/2002 |
| EP | 2133270 | 12/2009 |
| GB | 2010969 | 7/1979 |

OTHER PUBLICATIONS

German Search Report dated Dec. 10, 2012 from counterpart application.
Office Action issued by the German Patent Office dated Jul. 24, 2014 for counterpart German Patent Application No. 10 2012 014 108.4.

* cited by examiner

*Primary Examiner* — Gwendolyn W Baxter
(74) *Attorney, Agent, or Firm* — Timothy J. Klima; Shuttleworth & Ingersoll, PLC

(57) ABSTRACT

A transport securing device of an aircraft gas turbine includes a securing element, which at its two end areas is each provided with a first and a second connecting element, with the first connecting element being designed to be suitable for fastening to a front suspension device and the second connecting element being designed to be suitable for fastening to a rear suspension device of an aircraft gas turbine.

3 Claims, 3 Drawing Sheets

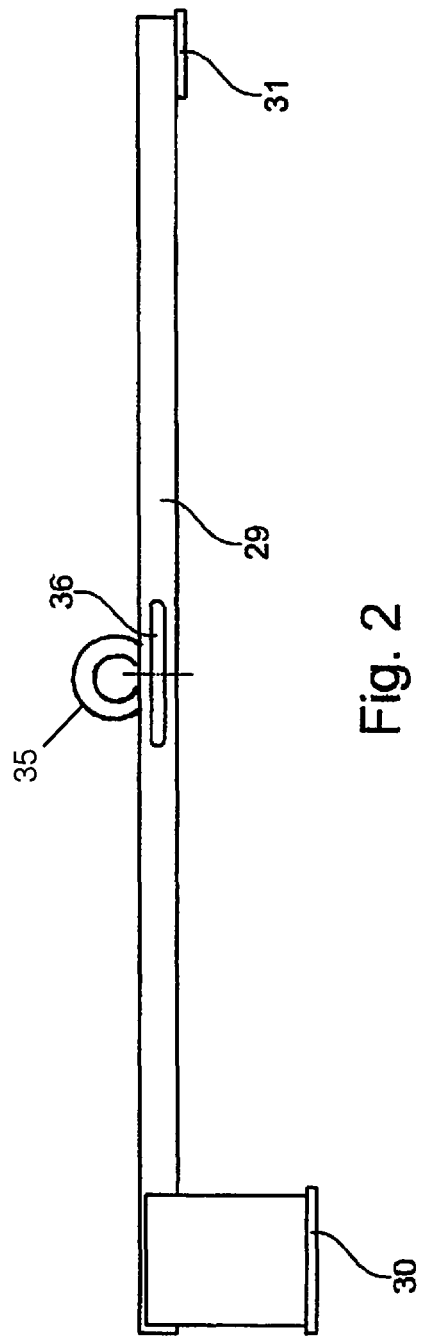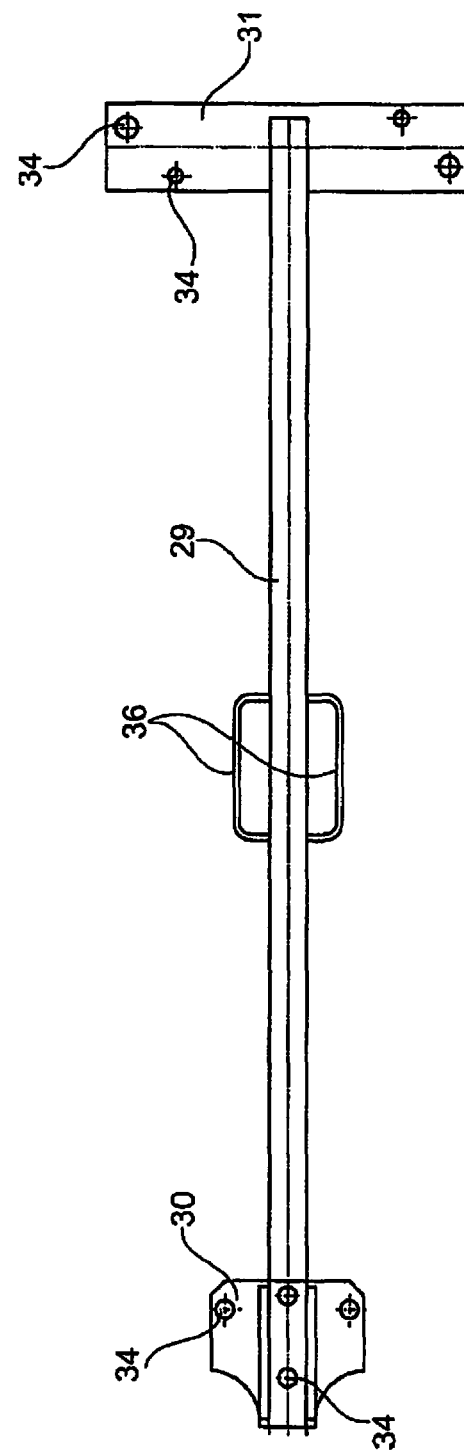

TRANSPORT SECURING DEVICE OF AN AIRCRAFT GAS TURBINE

Figure 1:
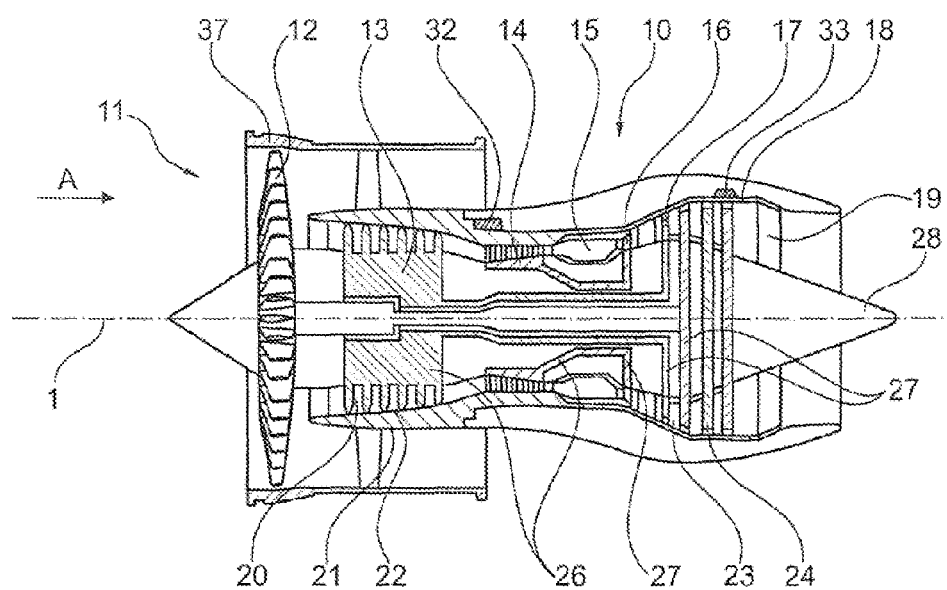

This application claims priority to German Patent Application DE102012014108.4 filed Jul. 17, 2012, the entirety of which is incorporated by reference herein.

This invention relates to a transport securing device of an aircraft gas turbine.

It is known from the state of the art to suspend aircraft gas turbines, with the engines being arranged underneath the wings of an aircraft, from a pylon by means of a front suspension device and a rear suspension device. To do so, the core engine is fastened at two areas to the aircraft wing such that the front suspension device absorbs the thrust forces of the engine as well as the load of the engine itself and the loads generated during flight, while the rear suspension device absorbs the load of the engine itself and the loads generated during flight.

Regarding the state of the art, reference is made to EP 2 133 270 A2 and DE 10 2009 054 568 A1 as examples.

The engine suspensions known from the state of the art are therefore designed such that the engine can be easily installed or de-installed as a module. To do so, an engine is fastened to a transport stand to permit subsequent installation on or de-installation from the aircraft wing.

During transport of the engine by means of a transport stand, the engine is not mounted using the front and rear suspension devices; instead it is fastened on the transport stand by means of additional suspension points. These additional suspension points can for example be on the fan casing, on the core engine or on a bypass duct, and they are designed such that the engine can be transported safely and easily and also fastened to an assembly frame which facilitates assembly, servicing or maintenance.

During transport of the engine, the front and the rear suspension devices are therefore not used, and so they have no function and are unsecured. Since the suspension devices are very solid components of relatively high weight, there is a danger of the suspension devices causing damage to parts of the engine or of the engine suspension during the transport operation, for example due to knocks. Particularly at risk here are components of the gas-turbine engine, for example variable compressor stator vane adjusters, the compressor casing, the turbine casing or similar. Damage to these components or assemblies can entail very cost-intensive and time-consuming repair work.

The object underlying the present invention is to provide a transport securing device of an aircraft gas turbine which, while being simply designed and easily and cost-effectively producible, avoids the disadvantages of the state of the art and secures the suspension devices.

It is a particular object of the present invention to provide solution to the above problems by a combination of the features described herein. Further advantageous embodiments of the present invention will become apparent from the present description.

In accordance with the invention, a securing element is therefore provided which has a connecting element at each of its two end areas. The securing element in accordance with the invention thus includes a first and a second connecting element. These connecting elements are designed to be suitable for fastening to a front suspension device and to a rear suspension device of the aircraft gas turbine. With a de-installed aircraft engine, therefore, the suspension devices provided in particular on the core engine are connected to one another by means of the securing element and safeguarded against undesired movements. This ensures in the event of knocks or similar stresses on the removed engine during its transport that the suspension devices cannot knock against components or assemblies of the engine and damage them. Instead, the suspension devices are, in accordance with the invention, secured and fixed relative to one another by means of the securing element.

In accordance with the invention, therefore, the risk of damage during transport is ruled out simply and inexpensively.

It is obvious that the securing element in accordance with the invention can, when several front and/or rear suspension devices of the engine are present, be fastened to these, thereby ensuring reliable transport securing.

In a particularly favourable embodiment of the invention, it is provided that the first and/or the second connecting element is designed plate-like and provided with recesses for passing bolts (threaded bolts, stud bolts) through them. The two connecting elements are therefore designed to match the front and rear suspension devices and can be fitted on the securing element using the fastening points provided for fitting the engine to an aircraft wing.

In a particularly favourable embodiment of the invention, it is provided that the securing element is designed in the form of a bar-like and elongated beam. Since the latter is not intended as a lifting means or for fixing of the engine itself, but only secures the suspension devices of the engine against one another, a simple and cost-effective embodiment can be provided.

It is furthermore advantageous when a handling attachment is arranged in the centre of gravity area of the securing element, so that the securing element can be moved with positional accuracy by means of a crane or a suitable auxiliary device.

In a particularly favourable development of the invention, it can be provided that those areas of the transport securing device in accordance with the invention that are to be connected to the front and the rear suspension devices of the aircraft gas turbine are provided with an intermediate layer or a coating of rubber, plastic or the like to prevent damage to the suspension devices.

It is self-evident that the first and the second connecting elements can also be designed in another manner, for example in the form of brackets or the like, in order to be adjusted to the front and rear suspension devices of the gas turbine.

The transport securing device in accordance with the invention can be made of steel or aluminum.

The transport securing device in accordance with the invention can, when suitably dimensioned and with suitably selected material, also be used for lifting of the engine, for example in order to reposition it or place it on a transport stand. With appropriate modification, the transport securing device could also be used as an assembly tool for both suspensions.

Figure 4:
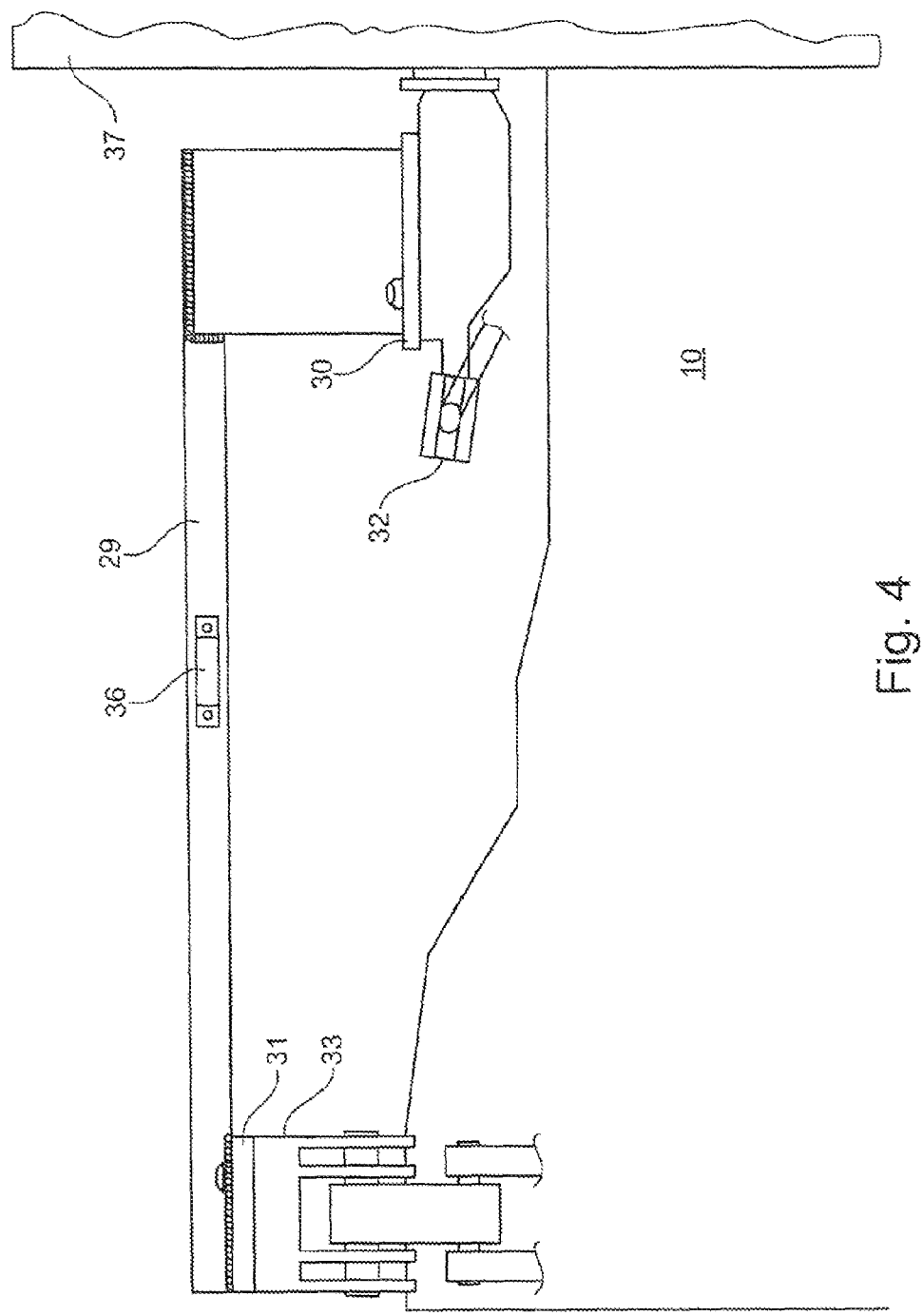

The present invention is described in the following in light of the accompanying drawing, showing an exemplary embodiment. In the drawing, FIG. 1 shows a schematic representation of a gas-turbine engine in accordance with the present invention, FIG. 2 shows a schematic side view of an exemplary embodiment of a securing element in accordance with the present invention, FIG. 3 shows a top view onto the securing element shown in FIG. 2, and FIG. 4 shows a simplified side view of the securing element in accordance with the present invention in an assembled state on a core engine.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 1 shows furthermore in a schematic representation a front suspension device 32 and a rear suspension device 33 which are provided on the core engine. With regard to the design of the suspension devices 32 and 33, reference can be made to the state of the art. The suspension devices can be designed in several parts and for example be adjustable.

FIGS. 2 and 3 show an exemplary embodiment of a securing element 29 in accordance with the invention. This element is designed in the form of an elongated and bar-like beam. The securing element 29 includes a first front connecting element 30 and a second rear connecting element 31. The front connecting element 30 can be coupled in an accurate fit to the front suspension device 32 of the engine, while the second rear connecting element 31 can be coupled in an accurate fit to the rear suspension device 33. To do so, the connecting elements 30 and 31 have recesses 34 through which threaded bolts can be passed which can be bolted to the suspension devices 32 and 33 respectively.

FIG. 4 shows a schematic side view of the securing element 29 in accordance with the invention in a state fitted to a core engine 10, where the front suspension device 32 and the rear suspension device 33 are each shown schematically. The reference numeral 37 shows a fan casing.

The securing element 29 is provided with a handling attachment 35 which is for example designed in the form of a lug and is preferably arranged in the centre of gravity in order to allow movement of the securing element 29 by means of an auxiliary device. In addition, handles 36 can be provided.

When an aircraft engine is fastened to a transport stand, therefore, the securing element in accordance with the invention can be connected to the suspension devices 32 and 33 in order to secure them and to prevent undesired movements of the suspension devices 32 and 33, thereby preventing damage to the engine.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chambers
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Securing element
30 First connecting element
31 Second connecting element
32 Front suspension device
33 Rear suspension device
34 Recess
35 Handling attachment
36 Handle
37 Fan casing

What is claimed is:

1. A transport securing device of an aircraft gas turbine comprising:
    a securing element including first and second end areas, the first end area including a first connecting element and the second end area including a second connecting element,
    the first connecting element configured for fastening to a front suspension device of an aircraft gas turbine and the second connecting element configured for fastening to a rear suspension device of the aircraft gas turbine;
    a handling attachment arranged in an area of a center of gravity of the securing element;
    wherein at least one chosen from the first and the second connecting elements has a plate shape and includes apertures for receiving bolts therethrough;
    wherein the securing element includes a bar shaped beam.

2. The transport securing device in accordance with claim 1, wherein the securing element further comprises a rubber intermediate element positioned on suspension device engagement surfaces of the first and the second connecting elements.

3. The transport securing device in accordance with claim 1, wherein the securing element further comprises a plastic intermediate element positioned on suspension device engagement surfaces of the first and the second connecting elements.

* * * * *